UNITED STATES PATENT OFFICE.

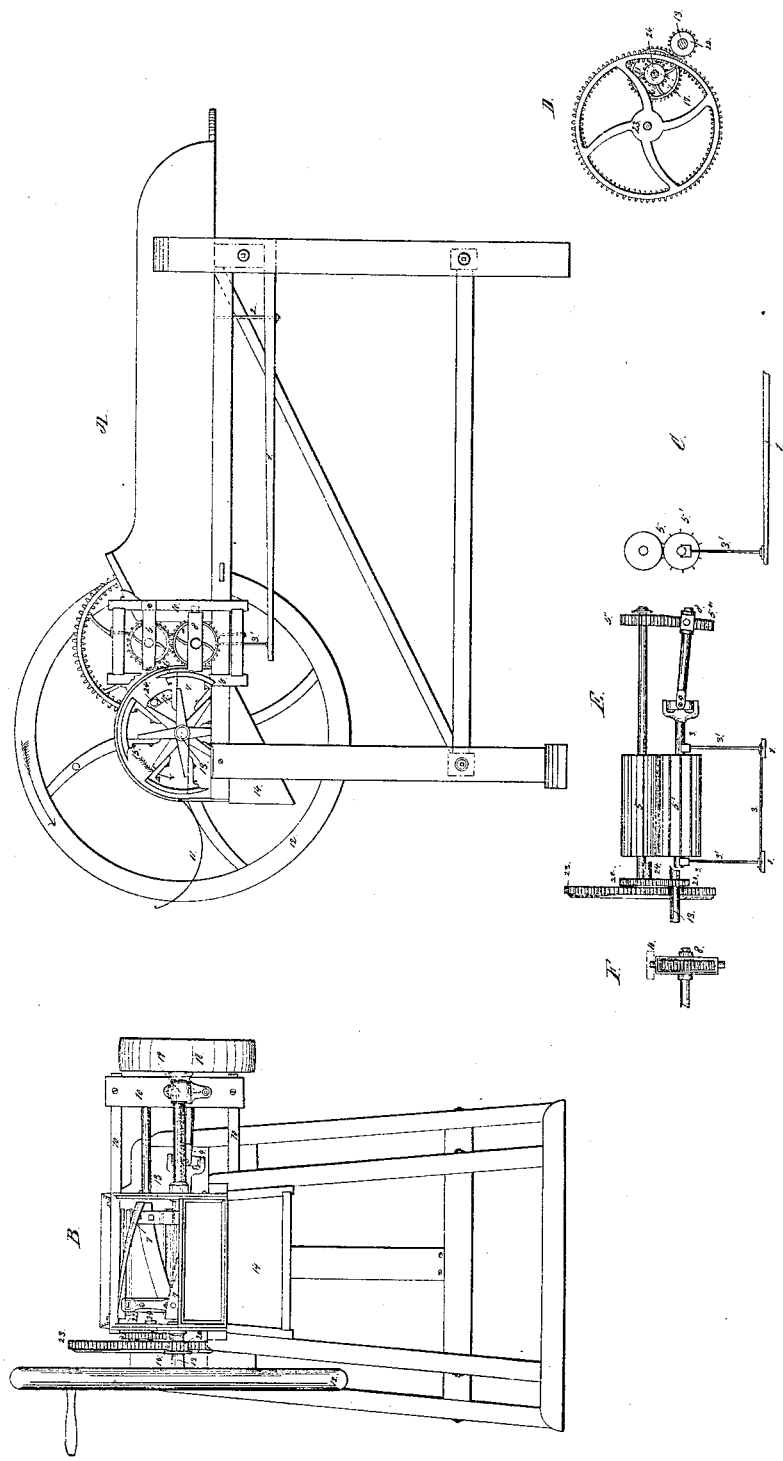
De W. C. Cumings,
Straw Cutter.
N° 13,385.
Patented Aug. 7, 1855.

DEWITT C. CUMINGS, OF FULTON, NEW YORK.

STRAW-CUTTER.

Specification forming part of Letters Patent No. 13,385, dated August 7, 1855; Reissued November 8, 1859, No. 847.

*To all whom it may concern:*

Be it known that I, DEWITT C. CUMINGS, of Fulton, in the county of Oswego and State of New York, have invented certain new and useful Improvements in Straw-Cutters; and I do hereby declare that the following is a full, clear, and exact description thereof, reference being had to the accompanying drawing, which forms part of this specification, and in which—

Figure A, represents a side view of the straw cutter, partly in elevation and partly in section. Fig. B, is an end view of the same. Fig. C, is an end view of the feed rollers and spring detached. Fig. D, is a detached view of the gearing for operating the feed rollers. Fig. E, is a front view of the feed rollers, with all the gearing to operate them. Fig. F, is a plan of the lower gear wheel, through which motion is communicated to the lower roller, showing the compensating method of hanging it.

My invention has reference to that class of straw cutters in which the rotary cylinder knives are used, and consists in an improved mode of operating the knives; also in the manner of hanging and operating the feed rollers; in the method of regulating or varying the length into which the material is to be cut; also in the application of the universal joint, and compensating method of hanging the driving wheel of the movable roller, to admit of its varying in position to accommodate a greater or less amount of feed; and in so operating the feed rollers, as to produce uniformity in length in the material cut.

For the better understanding of the construction and operation of my machine, I will describe it by referring to the drawings.

I construct the framing, and shoe or feed box, similar to that of the ordinary straw cutter heretofore used; at or near the end of the horizontal framing, is hung a shaft (13) with a series of radial arms usually 4 (four) in number, at equal distance apart, at each end within the side plates (15), and to the extremities of these arms, obliquely at an angle of about 25 degrees from a line parallel with the shaft, are attached the knives (7), extending from end to end; their edges at every point in their length, being equidistant from the center on which they revolve, are consequently the arcs of segments of a circle, whose radius is equal to their distance from the center of motion, and their chord equal to about one eighth of its circumference; thus far my rotary cylindrical cutter, is similar to those heretofore in use; but it differs from them, in the edges of the knives being set upward instead of downward, revolving in the direction indicated by the arrow, and by their oblique position effect a shearing cut on the straw or other material, against the under side of the mouth piece or cutting plate (6), which is fixed horizontally across the frame, and parallel to the axis of the cylindrical knives in close proximity to them; the reasons for, and advantages to be derived from this mode of cutting, are that all dry produce which is usually cut up to feed stock, contains more or less dust and dirt, and by the variety of methods of cutting downward, in feeding it to the cutters, the dirt, &c., is separated from the vegetable matter, and collect on the bottom of the feed box, and is carried forward in mass under the knives, and dulls them very quickly, and although once separated, it is again mixed with the feed, by discharging into the same receiver, and must be very injurious to the cattle; while by my invention, the feed rollers in pressing the material between them loosen the dirt, and on its passage from said rollers to the cutting edges is allowed to spread when it (the dirt) is liberated and falls beneath the machine, and by cutting upward no portion of it can collect on the mouth piece or cutting plate, to come in contact with the edges of the knives, and nothing but clean cut feed is discharged into the receiver.

The feed arrangement consists of a roller (5) hung in permanent journals in the frame (10), with a spur wheel (23) on one end of its axis, and another spur wheel (5″) on the other end; the wheel (23) is constructed with both internal and external gear, and through which motion is communicated to the roller, either directly, by gearing into the pinion (20) on the axis of the cutters, or through the counter wheel (22) and pinion (21); the counter wheel gearing into the pinion (20) on the cutter shaft, which said pinion is attached by a set screw, so that it may be readily moved on the shaft, to gear into the wheel (23) or the counter wheel (22). The pinion (21) on the same axis as the counter wheel, gears into the internal teeth of the wheel (23), and thus transmits its motion to the roller, in the same direction as if the pinion (20) were directly in gear with the wheel (23); whereas if the pinion (21) on the counter shaft, geared into the external teeth of the wheel (23), it would move it in the contrary direction, and require another intermediate wheel to turn it right way; the stud (24) or axis of the counter wheel and pinion, is fitted in a curvilinear slot (17) in the side plate (15), so that its position may be changed, to admit of different sized pinions being used, to vary the speed of the feed rollers, and consequently varying the length of the fragment cut.

Beneath the roller (5) and parallel with it, is a fluted or ribbed roller (5'), of similar length and diameter, having its axis in pillow boxes, supported on springs (1), by which it is borne up against the fixed roller, one spring on either side independent of each other, so that it may accommodate itself, to the varying quantity of feed from side to side of the box; the wheel (5''') gearing into that on the axis of the upper feed roller, is hung in a yoke (8) pivoted at each end in the framing (10), the axis of this wheel is connected with the axis of the lower feed roller, by a universal joint (4), which admits of the various change of position of said roller, while the wheel (5''') being hung in the yoke, accommodates itself to such change of position; with the ordinary feed apparatus where the rollers are of equal diameter, the upper portion of the material to be cut, or that portion in contact with the smooth roller, has a tendency to slip; consequently there is no uniformity in the length of the material cut; to remedy this difficulty, I cause the periphery of the smooth roller to travel at a greater velocity, either by fixing a smaller wheel on its axis than that on the axis of the ribbed roller, or by making the smooth roller of greater diameter, with their axis revolving at uniform speed.

The springs (1) at their thicker ends, bear against the under side of a cross piece in the framing of the feed box, and are supported by bolts (2) through them with nuts on their underside, their thin ends bearing the pillow boxes of the lower roller, before described, when they become weak, or set by long use in one position, by taking off the nuts that support them, they may be turned the other side up, when they will be fully as stiff as at first.

When this machine is operated by hand, the man should stand with his left side to the feed box, turning the balance wheel (12) by the handle, with his right hand, in the direction of the arrow, and feeding the material to the rollers with his left; or it may be worked by horse, or any other power by a band over the pulley (18).

This machine is equally applicable for cutting corn stalks or other fodder.

Having thus described my invention I wish to be understood that I do not claim the upward cut in itself as that has been done before, but, what I claim as new, and desire to secure by Letters Patent is—

1. The upward cut, when the material is fed in by a distinct device for that purpose by which the dirt is separated from the straw or other material to be cut, passing out beneath the feed rollers, instead of collecting on the stationary guard or cutting plate, substantially as and for the purposes specified.

2. Operating the movable feed roller by means of a spur wheel hung in a vibrating frame or yoke, with a universal coupling for connecting its axis with that of the roller, when said roller is supported on spring bearings independent of each other, substantially as and for the purposes specified.

3. The method of varying the feed by means of the double geared wheel (23) in combination with the counter wheel and pinion (22 and 21) and pinion (20) on the cutter shaft operating as herein specified.

In testimony whereof, I have hereunto subscribed my name.

DEWITT C. CUMINGS.

Witnesses:
A. L. VAN WAGENER,
I. HAYWARD FOSTER.

[FIRST PRINTED 1912.]